（12）United States Patent
Weinstock

(10) Patent No.: US 9,875,526 B1
(45) Date of Patent: Jan. 23, 2018

(54) DISPLAY OF THREE-DIMENSIONAL IMAGES USING A TWO-DIMENSIONAL DISPLAY

(71) Applicant: Neal Weinstock, Brooklyn, NY (US)

(72) Inventor: Neal Weinstock, Brooklyn, NY (US)

(73) Assignee: SOLIDDD CORP., Brooklyn, NY (US)

( * ) Notice: Subject to any disclaimer, the term of this patent is extended or adjusted under 35 U.S.C. 154(b) by 0 days.

(21) Appl. No.: 14/220,258

(22) Filed: Mar. 20, 2014

(51) Int. Cl.
*G06T 3/60* (2006.01)
*G06T 15/00* (2011.01)

(52) U.S. Cl.
CPC ............. *G06T 3/60* (2013.01); *G06T 15/00* (2013.01)

(58) Field of Classification Search
CPC ......... G06T 19/00; G06T 17/20; G06T 17/00; G06T 15/00; G06T 15/10; H04N 13/0402; H04N 13/0468
USPC .......................................................... 345/419
See application file for complete search history.

(56) References Cited

U.S. PATENT DOCUMENTS

| 2005/0275628 A1* | 12/2005 | Balakrishnan et al. ...... 345/156 |
| 2013/0314406 A1* | 11/2013 | Lin .......................... G06T 15/20 345/419 |
| 2014/0043335 A1* | 2/2014 | Kobayashi ......... H04N 13/0022 345/427 |
| 2015/0138184 A1* | 5/2015 | Bilbrey ............... H04N 13/0022 345/419 |

* cited by examiner

*Primary Examiner* — Kee M Tung
*Assistant Examiner* — Yanna Wu
(74) *Attorney, Agent, or Firm* — Ference & Associates LLC

(57) ABSTRACT

A device displays one of multiple views of a three-dimensional image and changes the particular view displayed in response to physical movement of the device. Each of the multiple two-dimensional views of a three-dimensional image is associated with orientations or ranges of orientations of the device. The device displays the one of the views associated with the current orientation of the device. As the device is moved from one orientation to another, the device displays the view associated with the current orientation in place of the view associated with the former orientation. The orientation can be angular orientation about a vertical axis or horizontal axis, or both axes.

12 Claims, 4 Drawing Sheets

DISPLAY OF THREE-DIMENSIONAL IMAGES USING A TWO-DIMENSIONAL DISPLAY

FIELD OF THE INVENTION

The present invention relates generally to image display systems, and, more particularly, to an image display system that displays three-dimensional images using a two-dimensional, electronic display.

BACKGROUND OF THE INVENTION

In recent years, there has been significant growth in devices capable of displaying three-dimensional images, including televisions, gaming devices, and smart phones. In conjunction with this growth is the increased interest in creating three-dimensional images, both static and video, to provide content that can be displayed in these devices. For example, a number of smart phones capable of displaying three-dimensional images are also equipped with three-dimensional cameras, i.e., cameras that capture multiple views simultaneously.

However, one of the main influences of smart phones in modern society is the near constant exchange of information with others. Accordingly, smart phones that capture three-dimensional images share those images with smart phones incapable of displaying three-dimensional images. Of course, smart phones and other devices incapable of displaying three-dimensional images are ever increasingly coming across three-dimensional images to be displayed.

There are a number of ways three-dimensional images can be displayed using a two-dimensional display. One is to simply display just one of the multiple views of the three-dimensional image. This has the disadvantage of failing to convey to the viewer any sense that the image was anything other than a two-dimensional image.

Another technique is to display the three-dimensional image as an anaglyph image in which two views are superimposed over one another, one view being tinted one color (e.g., cyan) and the other view being tinted a contrasting color (e.g., red). The viewer wears a pair of special glasses in which one lens is tinted with one of the contrasting colors and the other lens is tinted with the other contrasting color. This causes the viewer to see primarily one view with one eye and the other view with the other eye. However, the tinting of the views distorts the colors of the views such that the perceived three-dimensional image appears to have unnatural coloring. In addition, the anaglyph image is not perceivable as a three-dimensional image without the special glasses.

A third technique is "wiggle stereography," in which different views of the three-dimensional image are shown in relatively quick succession, giving the appearance of the three-dimensional image wiggling. This technique has the advantages of obviating special viewing equipment and preserving the proper coloring of the three-dimensional image. However, this technique has the disadvantages of persistent and annoying motion of the image and making it difficult for the viewer to appreciate detail in an image that's persistently in motion.

What is needed is an improved way to display three-dimensional images using a conventional two-dimensional display and in a way that appears more natural and realistic to the viewer.

SUMMARY OF THE INVENTION

In accordance with the present invention, a device displays one of multiple views of a three-dimensional image and changes the particular view displayed in response to physical movement of the device. In effect, the device—without any autostereoscopic structure—can simulate viewing an autostereoscopic display viewed with only one eye in that movement of the device changes the one of multiple views that is viewable. The result is a significantly more realistic perception of a three dimensions while maintaining proper coloring of the image, obviating special accessories for three-dimensional viewing, and avoiding other disadvantages of conventional techniques for displaying three-dimensional images in a two-dimensional display.

Each of the multiple two-dimensional views of a three-dimensional image is associated with orientations or ranges of orientations of the device. The device displays the one of the views associated with the current orientation of the device. As the device is moved from one orientation to another, the device displays the view associated with the current orientation in place of the view associated with the former orientation.

The orientation can be angular orientation about a vertical axis or horizontal axis, or both axes. In addition, the associations between views and orientations can be arranged such that movement of the device that changes a viewing angle to a display of the device from a stationary viewing position in a given direction changes the view to one corresponding to a change in viewing angle of the three-dimensional image in the same given direction. For example, rotation of the device about a vertical axis such that the left edge of the device is moved closer to the viewer and the right edge is moved further from the viewer such that the viewer's angle of view to the display of the device is moved to the left causes a view associated with a viewing angle further to the left to be displayed. Such enhances the perception of three dimensions in the two-dimensional display by the viewer.

A BRIEF DESCRIPTION OF THE DRAWINGS

DETAILED DESCRIPTION OF THE INVENTION

In accordance with the present invention, a device 102 (FIG. 1) displays one of multiple views of a three-dimensional image and changes the particular view displayed in response to physical movement of device 102. In effect, device 102—without any autostereoscopic structure—can simulate viewing an autostereoscopic display viewed with only one eye in that movement of device 102 changes the one of multiple views that is viewable. The result is a significantly more realistic perception of a three dimensions while maintaining proper coloring of the image, obviating special accessories for three-dimensional viewing, and avoiding other disadvantages of conventional techniques for displaying three-dimensional images in a two-dimensional display.

In this illustrative embodiment, physical rotation of device 102 by a human viewer about a vertical axis—i.e., as illustrated by arrows 106—is sensed by device 102 and, in response, device 102 changes which of a number of views of a three-dimensional image is displayed in display 104. In other embodiments, device 102 can change which of a number of views of a three-dimensional image is displayed in display 104 in response to other types of physical movement, including rotation about a horizontal axis as shown by arrows 108, movement horizontally, and movement vertically, for example.

Figure 1:
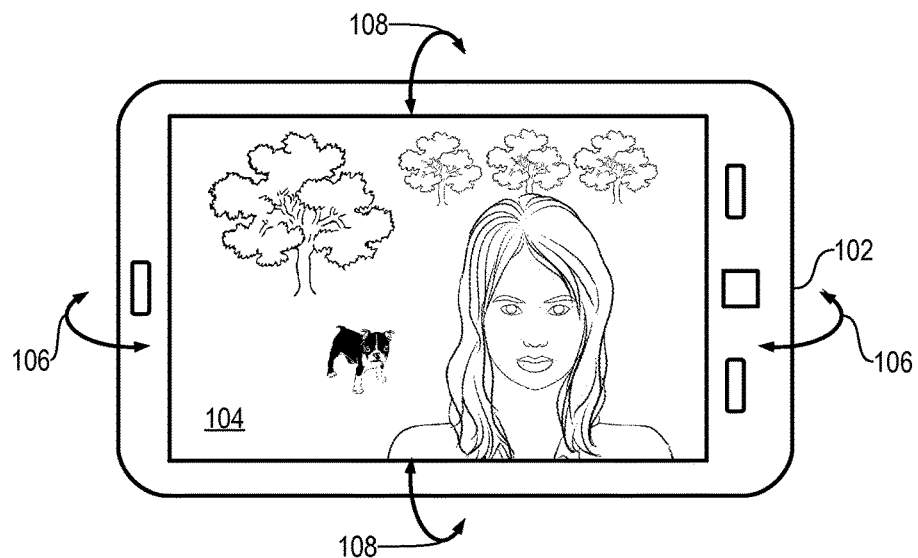
FIG. 1 is a diagram illustrating a device that displays three-dimensional images in accordance with the present invention.
Figure 2:
FIG. 2 shows left and right views that collectively provide a three-dimensional view of the image of FIG. 1.

FIG. 2 shows a left view 202L and a right view 202R of image 104 to illustrate multiple views of a three-dimensional image. It should be appreciated that the two views shown in FIG. 2 are merely illustrative and that three-dimensional images can have many more than just two views. Left view 202L is intended to be viewed by the viewer's left eye, which is naturally positioned to the left of the viewer's right eye. Accordingly, elements of the image that are nearer to the viewer are shifted to the right in left view 202L. Elements of the image further from the viewer are shifted to the left. This is consistent with the angle of view being slightly to the viewer's left from the center of display 104. Elements in right view 202R are shifted in the same manner but with the direction of shifting of elements reversed. In other words, elements of the image that are nearer to the viewer are shifted to the left in right view 202R and elements of the image further from the viewer are shifted to the right. This is consistent with the angle of view being slightly to the viewer's right from the center of display 104. This shifting can be seen in left view 202L and right view 202R in the alignment of the top of the head of the woman in the foreground with the line of trees in the distant background relative to the alignment of those elements in the image as shown in FIG. 1.

To promote the perception of depth by the human viewer, physical movement of device 102 that would move the human viewer's angle of view move to the left causes device 102 to change the view displayed in display 104 to one corresponding to an angle of view further left. For example, consider that device 102 is displaying right view 202R in display 104 and the viewer rotates device 102 in the direction of arrows 106 such that the left edge of device 102 is moved closer to the viewer and the right edge of device 102 of moved further from the viewer, device 102 can display left view 202L in display 104. The result is that the human viewer is able to view the image in display 104 from a more left perspective by physically moving device 102 in a direction that would afford the viewer that perspective if the image were indeed three-dimensional or if the image were displayed in an autostereoscopic display.

Figure 3:
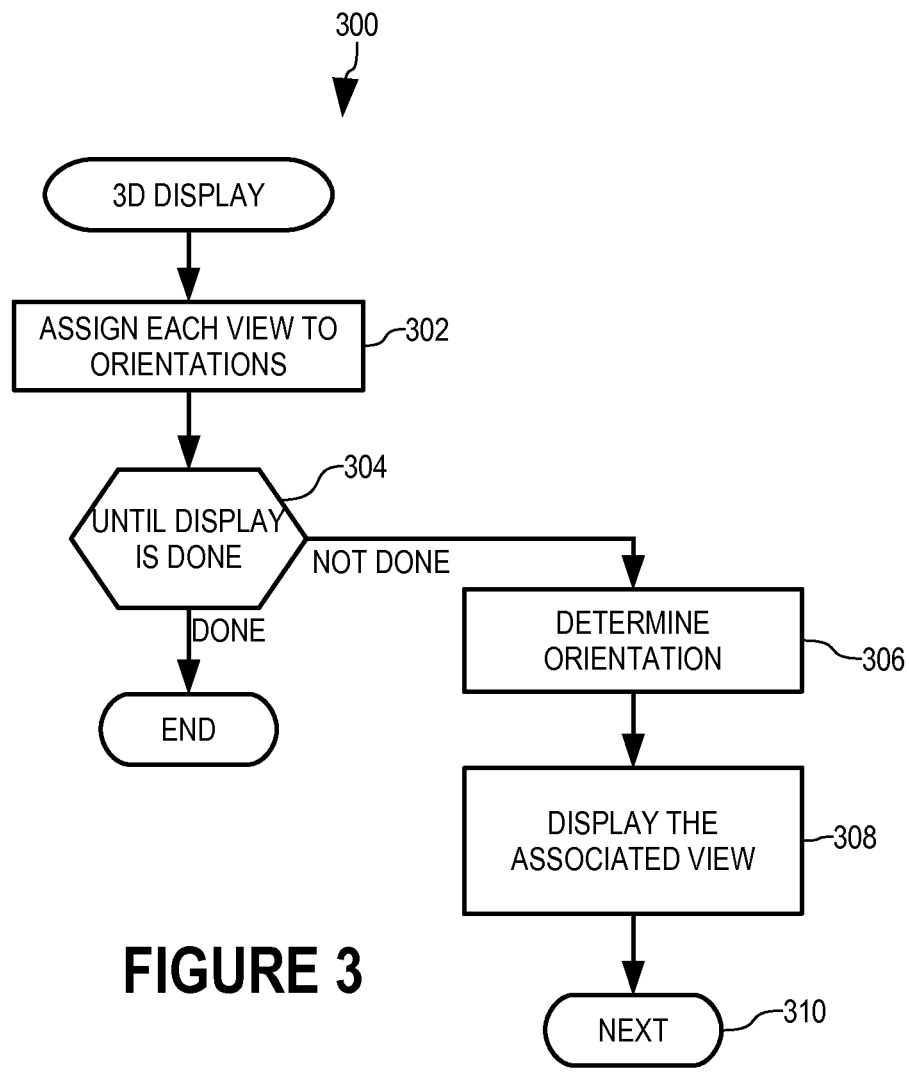
FIG. 3 is a logic flow diagram showing display of a three-dimensional image by the device of FIG. 1 in accordance with the present invention.

The manner in which device 102 displays three-dimensional images using two-dimensional display 104 is illustrated by logic flow diagram 300 (FIG. 3). In step 302, 3D display logic 430 (FIG. 4) of device 102 assigns each of the multiple views of a three-dimensional image to a particular orientation or range of orientations of device 102. Multi-view image 500 (FIG. 5) illustrates a data structure that represents multiple views of a three-dimensional image and includes a number of views 502. Each view 502 includes a relative view angle 504 and view image data 506. Relative view angle 504 specifies an angle of view of view 502 relative to angles of view of others of views 502. View image data 506 specifies a two-dimensional image representing a view of the three-dimensional image from the angle of view specified by relative view angle 504.

In one embodiment, relative view angle 504 is stored as Exif (Exchangeable image file format) meta-data in view image data 506. In another embodiment, relative view angle 504 is omitted and the relative viewing angles of the respective views 502 is inferred from the ordering of views 502 in multi-view image 500.

Returning to step 302 (FIG. 3) in which 3D display logic 430 assigns orientations or ranges or orientations of device 102 to each of views 502, the following embodiment is illustrative. 3D display logic 430 determines a range of viewing angles that includes all of views 502. For example, consider that the maximum viewing angle difference between views 502 is ten (10) degrees. In addition, consider that multi-view image 500 includes five (5) views 502 in two-degree increments of viewing angles. 3D display logic 430 assigns orientations by dividing the orientation of device 102 by two—providing an orientation within a range of zero to 180 degrees—and calculating modulo five of the result. This is represented by the following equation (1).

$$\text{view} = \left(\frac{\text{orientation}}{\text{view angle increment}}\right) \text{modulo } n_{views} \quad (1)$$

Loop step 304 and next step 310 define a loop in which 3D display logic 430 performs steps 306-308 until three-dimensional image viewing is terminated by the human viewer.

In step 306, 3D display logic 430 determines the orientation of device 102. In step 308, 3D display logic 430 displays the one of views 502 (FIG. 5) that is associated with the determined orientation according to the assignments made in step 302.

Processing by 3D display logic 430 transfers from step 308 through next step 310 to loop step 304 from which 3D display logic 430 repeats steps 306-308. When the human viewer terminates three-dimensional image viewing, e.g., pressing a "Back" button on device 102, processing according to logic flow diagram 300 completes.

Figure 4:
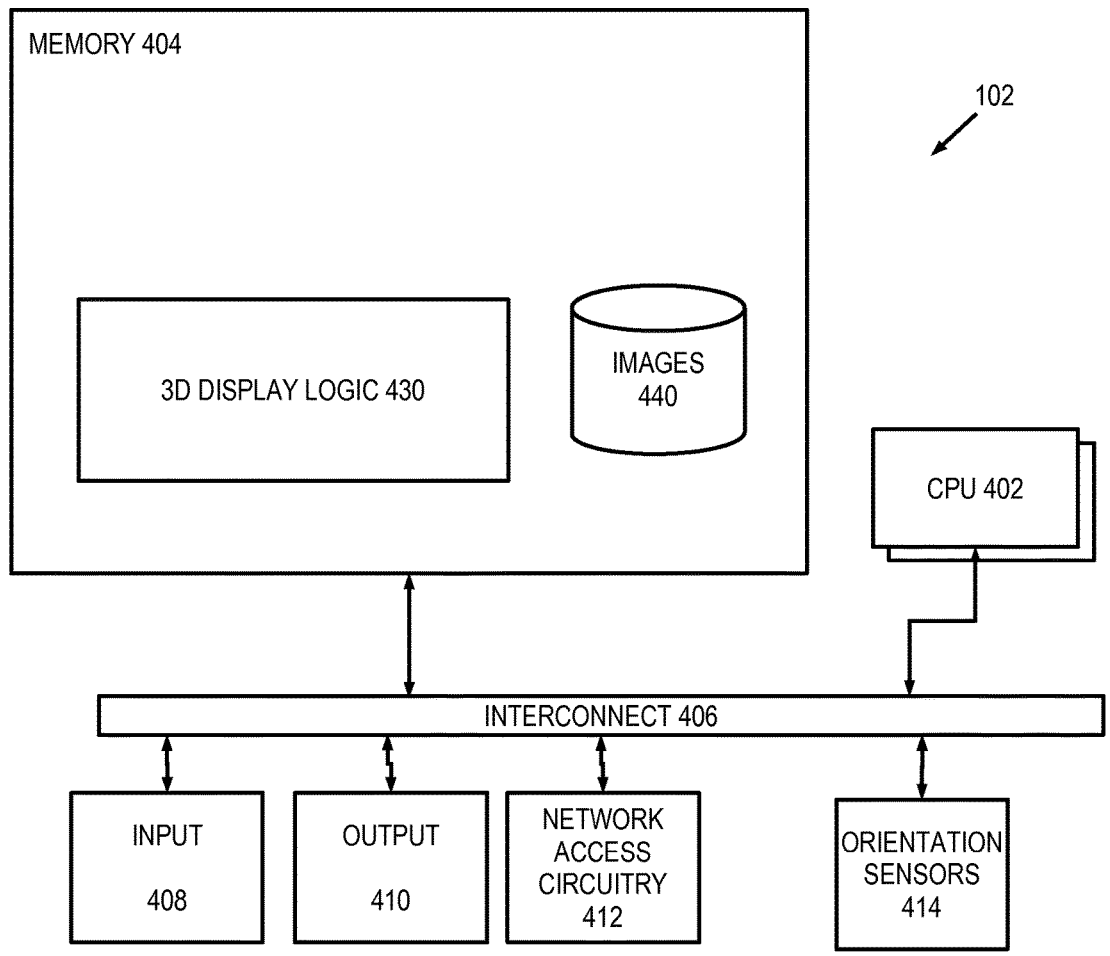
FIG. 4 is a block diagram showing the device of FIG. 1 in greater detail.
Figure 5:
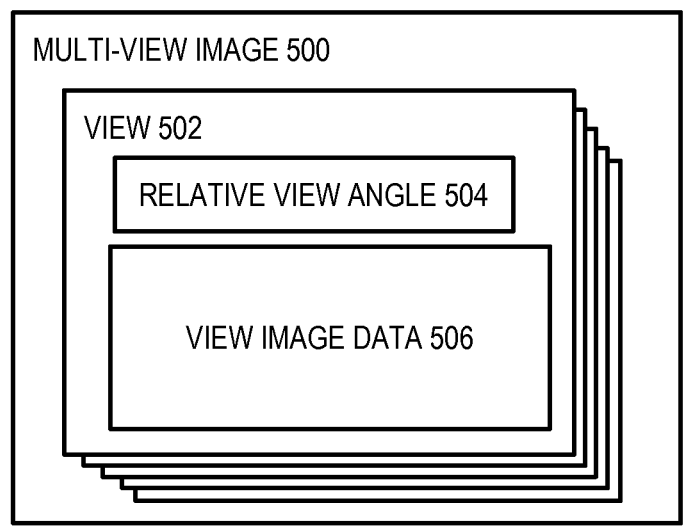
FIG. 5 is a block diagram of a three-dimensional image that can be displayed by the device of FIG. 1 in accordance with the present invention.

Some elements of device 102 are shown diagrammatically in FIG. 4. Device 102 is a smart phone in this illustrative embodiment. However, many other types of devices include both the ability to display images and sense movement and/or orientation of such devices, and device 102 can be any of these devices as well. Device 102 includes one or more microprocessors 402 (collectively referred to as CPU 402) that retrieve data and/or instructions from memory 404 and execute retrieved instructions in a conventional manner. Memory 404 can include any tangible computer readable media, e.g., persistent memory such as magnetic and/or optical disks, ROM, and PROM and volatile memory such as RAM.

CPU 402 and memory 404 are connected to one another through a conventional interconnect 406, which is a bus in this illustrative embodiment and which connects CPU 402 and memory 404 to one or more input devices 408 and/or output devices 410, network access circuitry 412, and orientation sensors 414. Input devices 408 can include, for example, a keyboard, a keypad, a touch-sensitive screen, a mouse, and a microphone. Output devices 410 can include a display—such as a liquid crystal display (LCD)—and one or more loudspeakers. Output devices 410 include display 104 (FIG. 1). Network access circuitry 412 sends and receives data through computer networks. Orientation sensors 414 measure orientation of device 102 in three dimensions and report measured orientation through interconnect 406 to CPU 402.

A number of components of device 102 are stored in memory 404. In particular, 3D display logic 430 is all or part of one or more computer processes executing within CPU 402 from memory 404 in this illustrative embodiment but can also be implemented, in whole or in part, using digital logic circuitry. As used herein, "logic" refers to (i) logic implemented as computer instructions and/or data within one or more computer processes and/or (ii) logic implemented in electronic circuitry. Images 440 is data representing one or more images, e.g., multi-view image 500 (FIG. 5) and stored in memory 404 (FIG. 4).

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for displaying a three-dimensional image, which includes two or more two-dimensional views, on a display device of a mobile information handling device, the method comprising:
    simulating the three-dimensional image on the display device of the mobile information handling device by:
        determining a first state of orientation of the mobile information handling device;
        selecting a first of the two-dimensional views that is assigned to the first state of orientation;
        displaying, on the display device, the first two-dimensional view;
        identifying movement of the mobile information handling device from the first state of orientation to a second state of orientation and determining a value associated with the identified movement and a direction of the identified movement;
        selecting a second of the two-dimensional views that is assigned to the second state of orientation, wherein the selecting comprises identifying, from the two or more two-dimensional views, a view having a state of orientation that correlates to the value associated with the identified movement, a direction of the identified movement, and the number of the two-dimensional views captured; and
        displaying, on the display device, the second two-dimensional view;
    wherein each of the two-dimensional views comprise a view of the three-dimensional image having a viewing perspective associated with an orientation of the mobile information handling device and wherein, upon movement of the mobile information handling device, the three-dimensional image is simulated on the display device due to a change in viewing perspective of each of the two-dimensional views, wherein the viewing perspective comprises an object as a focal point in the view and wherein other objects within the view move with respect to the object based upon the value associated with the identified movement and the direction of the identified movement.

2. The method of claim 1 wherein the first and second states of orientation are each a state of angular orientation about a vertical axis.

3. The method of claim 1 wherein the movement of the mobile information handling device from the first state of orientation to the second state of orientation changes an angle of view to a display of the mobile information handling device from a stationary viewing position in a given direction; and
    wherein the second two-dimensional view is associated with a viewing angle that differs from a viewing angle of the first two-dimensional view in the given direction.

4. The method of claim 1, wherein the identifying a view having a state of orientation that correlates to the number of the two-dimensional views captured comprises determining a viewing angle difference between a first of the captured two-dimensional views and a last of the captured two-dimensional views, determining an increment determined as the quotient of the viewing angle difference by a total number of captured two-dimensional images, and identifying a view increment correlating to the view.

5. A non-transitory tangible computer readable medium useful in association with a mobile information handling device which includes one or more processors and a memory, the computer readable medium including computer instructions which are configured to cause the computer, by execution of the computer instructions in the one or more processors from the memory, to display a three-dimensional image, which includes two or more two-dimensional views, on a display device of the mobile information handling device, by at least:
    simulating the three-dimensional image on the display device of the mobile information handling device by:
        determining a first state of orientation of the mobile information handling device;
        selecting a first of the two-dimensional views that is assigned to the first state of orientation; displaying, on the display device, the first two-dimensional view;
        identifying movement of the mobile information handling device from the first state of orientation to a second state of orientation and determining a value associated with the identified movement and a direction of the identified movement;
        selecting a second of the two-dimensional views that is assigned to the second state of orientation, wherein the selecting comprises identifying, from the two or more two-dimensional views, a view having a state of orientation that correlates to the value associated with the identified movement, a direction of the identified movement, and the number of the two-dimensional views captured; and
        displaying, on the display device, the second two-dimensional view;
    wherein each of the two-dimensional views comprise a view of the three-dimensional image having a viewing perspective associated with an orientation of the mobile information handling device and wherein, upon movement of the mobile information handling device, the three-dimensional image is simulated on the display device due to a change in viewing perspective of each of the two-dimensional views, wherein the viewing perspective comprises an object as a focal point in the view and wherein other objects within the view move with respect to the object based upon the value associated with the identified movement and the direction or the identified movement.

6. The computer readable medium of claim 5 wherein the first and second states of orientation are each a state of angular orientation about a vertical axis.

7. The computer readable medium of claim 5 wherein the movement of the mobile information handling device from the first state of orientation to the second state of orientation changes an angle of view to a display of the mobile information handling device from a stationary viewing position in a given direction; and wherein the second two-dimensional view is associated with a viewing angle that differs from a viewing angle of the first two-dimensional view in the given direction.

8. The computer readable medium of claim 5, wherein the identifying a view having a state of orientation that correlates to the number of the two-dimensional views captured comprises determining a viewing angle difference between a first of the captured two-dimensional views and a last of the captured two-dimensional views, determining an increment determined as the quotient of the viewing angle difference by a total number of captured two-dimensional images, and identifying a view increment correlating to the view.

9. A mobile information handling device comprising:

at least one processor;

a display operatively coupled to the processor;

a computer readable medium operatively coupled to the processor; and three-dimensional display logic (i) that at least in part executes in the processor from the computer readable medium and (ii) that, when executed by the processor, causes the computer to display a three-dimensional image, which includes two or more two-dimensional views, on the display by at least:

simulating the three-dimensional image on the display device of the mobile information handling device by:

determining a first state of orientation of the mobile information handling device;

selecting a first of the two-dimensional views that is assigned to the first state of orientation;

displaying, on the display, the first two-dimensional view;

identifying movement of the mobile information handling device from the first state of orientation to a second state of orientation and determining a value associated with the identified movement, a direction of the identified movement, and the number of the two-dimensional views captured;

selecting a second of the two-dimensional views that is assigned to the second state of orientation, wherein the selecting comprises identifying, from the two or more two-dimensional views, a view having a state of orientation that correlates to the value associated with the identified movement and a direction of the identified movement; and displaying, on the display, the second two-dimensional view;

wherein each of the two-dimensional views comprise a view of the three-dimensional image having a viewing perspective associated with an orientation of the mobile information handling device and wherein, upon movement of the mobile information handling device, the three-dimensional image is simulated on the display device due to a change in viewing perspective of each of the two-dimensional views, wherein the viewing perspective comprises an object as a focal point in the view and wherein other objects within the view move with respect to the object based upon the value associated with the identified movement and the direction or the identified movement.

10. The computer system of claim 9 wherein the first and second states of orientation are each a state of angular orientation about a vertical axis.

11. The computer system of claim 9 wherein the movement of the mobile information handling device from the first state of orientation to the second state of orientation changes an angle of view to a display of the mobile information handling device from a stationary viewing position in a given direction; and wherein the second two-dimensional view is associated with a viewing angle that differs from a viewing angle of the first two-dimensional view in the given direction.

12. The computer system of claim 9, wherein the identifying a view having a state of orientation that correlates to the number of the two-dimensional views captured comprises determining a viewing angle difference between a first of the captured two-dimensional views and a last of the captured two-dimensional views, determining an increment determined as the quotient of the viewing angle difference by a total number of captured two-dimensional images, and identifying a view increment correlating to the view.

\* \* \* \* \*